United States Patent [19]
Fasquel

[11] Patent Number: 5,519,434
[45] Date of Patent: May 21, 1996

[54] SPLIT-BAND AMPLIFIER FOR TELEVISION SIGNALS

[75] Inventor: Jean-Marc Fasquel, Louviers, France

[73] Assignee: U.S. Philips Corporation, New York, N.Y.

[21] Appl. No.: 483,914

[22] Filed: Jun. 7, 1995

Related U.S. Application Data

[63] Continuation of Ser. No. 192,401, Feb. 4, 1994, abandoned.

[30] Foreign Application Priority Data

Feb. 17, 1993 [FR] France .................. 93 01803

[51] Int. Cl.$^6$ .................. H04N 7/10; H04B 3/00
[52] U.S. Cl. .................. 348/6; 455/6.1; 333/167; 348/707
[58] Field of Search .................. 348/6–12, 707; 455/6.1; 333/167; H04N 7/10; H04B 3/00

[56] References Cited

U.S. PATENT DOCUMENTS 4,079,415  3/1978  Will .................. 348/11
4,100,371  7/1978  Bayliff .................. 179/1

FOREIGN PATENT DOCUMENTS 1106667  1/1953  France .

*Primary Examiner*—Safet Metjahic
*Assistant Examiner*—Cheryl Cohen
*Attorney, Agent, or Firm*—Edward W. Goodman

[57] ABSTRACT

A split-band device for transmitting and amplifying television signals between an input terminal and an output terminal which can each be coupled to a distribution cable having a characteristic impedance $R_0$. The device comprises first and second parallel-arranged branches comprising, respectively, first and second amplifiers. The first branch has a high-pass first filter arranged between the input terminal and its first amplifier and the second branch has a low-pass second filter arranged between the input terminal and its second amplifier to select a second frequency range different from a first frequency range of the first amplifier. The first and second filters each have the same nominal cut-off frequency, with the first filter having at its input an input capacitance disposed in series in the first branch and having a value C, and with the second filter having at its input an input inductance disposed in series in the second branch and having a value L, the nominal value of the ratio of the values L/C being equal to $2 R_0^2$.

12 Claims, 1 Drawing Sheet

SPLIT-BAND AMPLIFIER FOR TELEVISION SIGNALS

This is a division of application Ser. No. 08/192,401, filed Feb. 4, 1994 now abandoned.

BACKGROUND OF THE INVENTION

The invention relates to a device for transmitting and amplifying television signals, which device has an input terminal and an output terminal which can each be coupled to a distribution cable having a characteristic impedance $R_o$, a first and a second branch being arranged in parallel with one another between said two terminals, which branches each comprise an amplifier, a high-pass filter being arranged between the input terminal and the amplifier of the first branch and a low-pass filter being arranged between the input terminal and the amplifier of the second branch in order to select a different frequency range for each of the two amplifiers.

Such a device is used particularly in cable television systems known as "MATV" or "CATV".

A device of the type defined in the opening paragraph is known from the document FR 1,106,667. In this known device the filters have been designed to provide two different frequency bands from 60 kHz to 4.1 MHz and from 5 MHz to 13 MHz, respectively. A similar arrangement referred to as a "split-band" arrangement is used in television for separately amplifying the VHF band (47–420 MHz) and the UHF band (470–860 MHz). It will be evident that a correct separation of frequencies which are spaced as closely as 420 MHz (upper limit of the VHF band) and 470 MHz (lower limit of the UHF band) requires a steep roll-off and high-order filters. Such filters are expensive and, in addition, they introduce substantial phase shifts, which may be annoying. Moreover, there is a gap between the frequency bands of each of the branches.

In order to obtain a continuous pass band it is, of course, possible to use a single amplifier covering the entire band from 47 to 860 MHz. However, a better performance as regards gain and distortion is obtained if the pass band is split into two parts because a satisfactory performance is easier to obtain as the pass band is narrower.

It is desired to have a device which provides a continuous pass band and has a better performance than a broadband amplifier. To achieve this, it may be envisaged to use a known device having two branches and to bring the cut-off frequencies of the two filters closer to one another or make them even coincide in order to reduce or to eliminate the discontinuity between the two parts of the pass band. Phase shifts in the filters then give rise to annoying irregularities of the amplitude and phase in the vicinity of the cut-off frequencies.

SUMMARY OF THE INVENTION

The invention provides a device which has two amplifiers, each one of the amplifiers handling another frequency band than the other amplifier, and which, in spite of this, does not exhibit any annoying irregularities or phase shifts in the vicinity of the cut-off frequencies.

According to the invention the two filters have the same nominal cut-off frequency, the high-pass filter having an input capacitance of a value C at its input, disposed in series in the first branch, and the low-pass filter having an input inductance of a value L at its input, disposed in series in the second branch, and the nominal value of the ratio L/C is equal to $2 R_o^2$.

The invention is based on the idea of using two filters which are more or less complementary with one another and on the recognition of the fact that annoying irregularities can be avoided by a specific relationship between the impedances of the components at the inputs of these filters.

Moreover, it has been found that such a device operates satisfactorily even with a moderate roll-off, which makes it possible to realise cheaper filters. If the two filters are, for example, of the second order, the low-pass filter has a shunt capacitance arranged downstream of the input inductance, which shunt capacitance has a value equal to that of the input capacitance of the high-pass filter, and the high-pass filter has a shunt inductance arranged downstream of the input capacitance, which shunt inductance has a value equal to that of the input inductance of the low-pass filter.

In an advantageous embodiment the device has a high-pass filter arranged between the amplifier of the first branch and the output terminal, and a low-pass filter arranged between the amplifier of the second branch and the output terminal, each of said filters being similar to the respective filter at the input of the branch.

In the invention it is not necessary to provide special amplifiers for each frequency range.

Thus, a configuration as defined above, may comprise of two identical broadband amplifiers.

Conversely, if the two amplifiers differ from one another it is advantageous if one of the branches includes a delay circuit in order to compensate for differences in transit time between the two branches around the cut-off frequency of the filters.

These and other more detailed aspects will become apparent from the following description of an embodiment given by way of non-limitative example.

DETAILED DESCRIPTION OF PREFERRED EMBODIMENTS OF THE INVENTION

Figure 1:
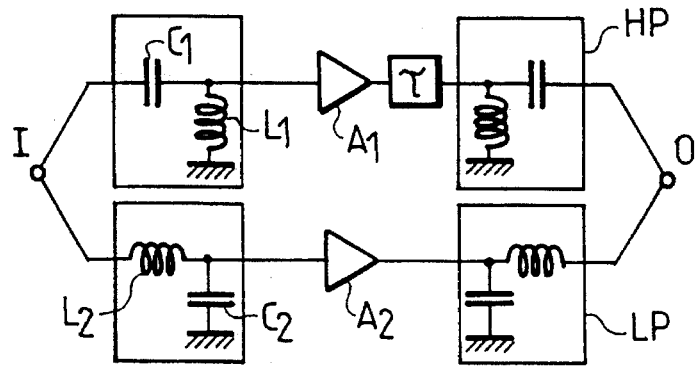
FIG. 1 is a circuit diagram of a device in accordance with the invention.

The device whose diagram is shown in FIG. 1 has a basic structure with complementary filters, and comprises between an input terminal I and an output terminal O a first branch and a second branch, which branches are in parallel with one another and each comprise an amplifier, A1 and A2 respectively. A second-order high-pass filter formed by a capacitance C1 arranged in series in the branch and followed by an inductance L1 shunted to earth is included between the input terminal I and the amplifier A1 of the first branch. A second-order low-pass filter formed by an inductance L2 arranged in series in the branch and followed by a capacitance C2 shunted to earth is included between the input terminal I and the amplifier A2 of the second branch. These filters serve to select a different frequency range for each of the two amplifiers.

The high-pass filter C1, L1 and the low-pass filter L2, C2 have substantially the same cut-off frequency, i.e. 450 MHz for an attenuation of 3 dB. L2/C1=2 $R_o^2$ ($R_o$ is the characteristic impedance of the lines and the inputs/outputs) and, moreover, C1 and C2 are equal and L1 and L2 are also equal.

It is possible to use higher order filters although the advantage of this is not evident. In that case the ratio $L2/C1=2R_o^2$ should always be maintained but the values of the shunt elements are different because they are followed by other elements. For example, if the cell L1, C1 is followed by a second cell L'1, C'1 (not shown) having the same structure as L1, C1 and if the cell L2, C2 is followed by a second cell L'2, C'2 (not shown) having the same structure as L2, C2 a choice would have to be made from the following relationships, the values of L2 and C1 not being changed:

$L1=L2*(\sqrt{2}-1)$, $C'1=C1*\sqrt{2}$, $L'1=L2*(1+1/\sqrt{2})$, $C2=C1/(\sqrt{2}-1)$ $L'2=L2/\sqrt{2}$, $C'2=C1/(1+1/\sqrt{2})$.

The device further comprises a high-pass filter HP between the amplifier A1 of the first branch and the output terminal O, and a low-pass filter LP between the amplifier A2 of the second branch and the output terminal O, each of these filters being similar to the respective filter at the input of the branch. For the 3 dB cut-off frequency in the case of second-order filters the signal in the first branch will have a lead of π at the output of the input filter and will be given an additional lead of π in the output filter so that its lead becomes 2π, regardless of the phase shift to which it is subjected in the amplifier. For the same 3 dB cut-off frequency the signal in the second branch will have a delay of π at the output of the input filter and will be given an additional delay of π in the output filter, so that its delay becomes 2π, regardless of the phase shift to which it is subjected in the amplifier. If the amplifiers are identical to one another the signals of the two branches will eventually be in phase at the output terminal O. It is to be noted that if the amplifiers are omitted an all-pass structure having a constant envelope delay will be obtained.

Figure 2:
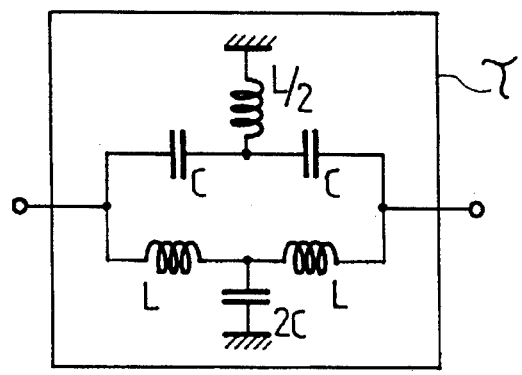
FIG. 2 is a circuit diagram of a delay circuit.

However, the amplifiers need not be identical but in that case, since the two branches should remain in phase in the common part of the pass band so as to avoid undesirable interference, one of the branches should be provided with a delay circuit τ. Such a delay circuit τ, shown in detail in FIG. 2, for example consists of an all-pass filter without amplifier.

The amplifiers are, for example, cascode amplifiers constructed as hybrid integrated circuits. Some of them have a better performance for VHF than for UHF, which is advantageous here because the all-pass structure improves particularly the UHF performance: the use of two amplifiers of this type will consequently restore the balance between UHF and VHF.

When use is made of amplifier modules of the type BGY885A, which are commercially available from the Applicant, and filters which each comprise an inductance of 38 nH and a capacitance of 3.3 pF the invention provides an improvement of approximately 8 dB as regards the composite second order distortion ("CSO") and an equal improvement as regards composite third-order beats ("CTB") in comparison with a structure comprising a single module.

Figure 3:
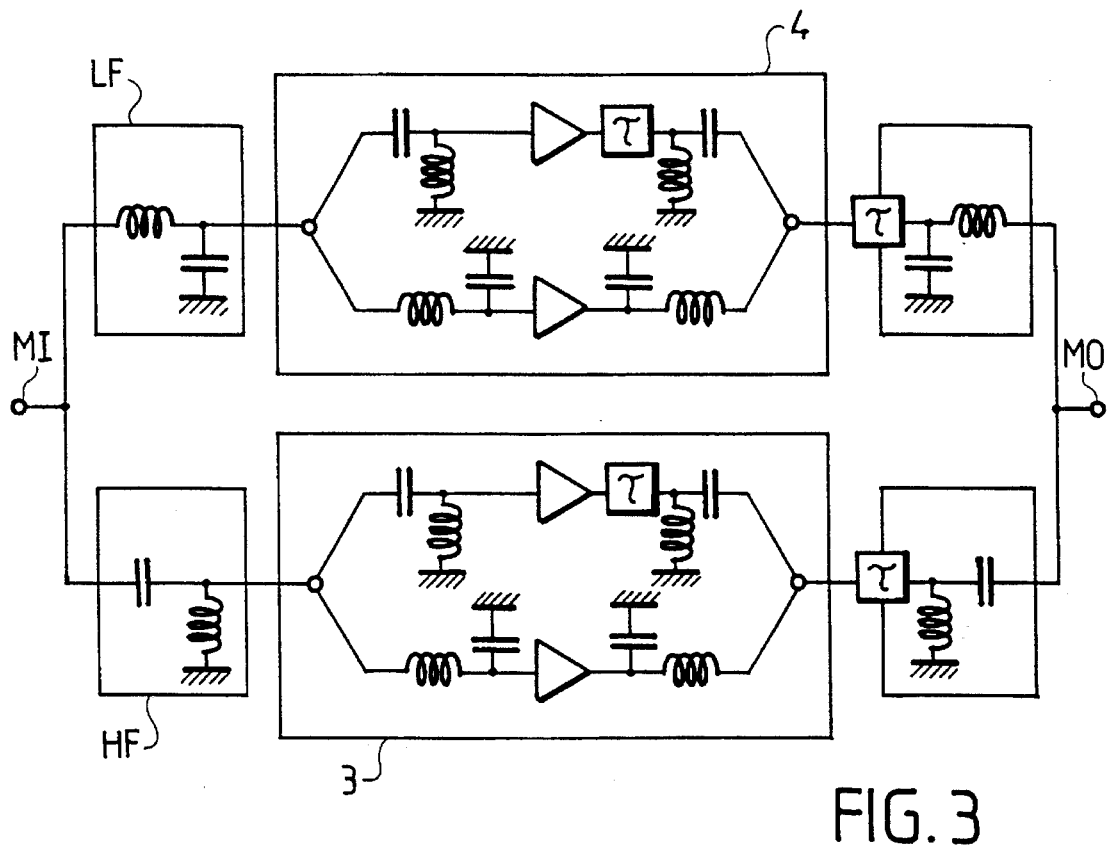
FIG. 3 is a circuit diagram of a combination of two devices.

It may also be envisaged to split the frequency band into four, eight, or up to $2^n$ parts. In practice, since different filters have different cut-off frequencies, it is then necessary to provide different additional delays τ, which increases the complexity and requires adjustments. FIG. 3 shows such an arrangement with a frequency band split into four parts. It comprises two devices 3 and 4 arranged in parallel between a general input terminal MI and a general output terminal MO, a high-pass filter HF arranged between the general input terminal and the input terminal of the first device 3, and a low-pass filter LF arranged between the general input terminal and the input terminal of the second device 4, the devices 3 and 4 each having a different cut-off frequency. The filters HF and LF have, for example, a common cut-off frequency of 450 MHz, the device 3 has a cut-off frequency of 650 MHz and the device 4 has a cut-off frequency of 250 MHz. Delay elements τ, which of course differ from one another, are arranged at the input or the output (in the situation shown) of each the devices 3 and 4. However, the additional advantage provided by this arrangement is comparatively small in relation to a simple structure with two amplifiers but its price is more than doubled.

I claim:

1. A device for transmitting and amplifying television signals, said device comprising:

a) an input terminal and an output terminal, said input and output terminals being coupleable to a distribution cable having a characteristic impedance $R_0$;

b) a first and a second branch comprising, respectively, first and second amplifiers, said first and second branches being arranged in parallel with one another between the input and output terminals;

c) a high-pass first filter arranged in the first branch between the input terminal and the first amplifier, said first filter selecting a first frequency range for the first amplifier; and d) a low-pass second filter arranged in the second branch between the input terminal and the second amplifier, said second filter selecting a second frequency range, different from the first frequency range, for the second amplifier;

e) said first and second filters being of the second order and having the same nominal cut-off frequency, f) said first filter having at its input an input capacitance disposed in series in the first branch and having a value C1, g) said second filter having at its input an input inductance disposed in series in the second branch and having a value L2, and h) the nominal value of the ratio of the values L2/C1 being equal to $2R_0^2$.

2. A device as claimed in claim 1, wherein the second filter has a shunt capacitance arranged downstream of the input inductance and having a value equal to C2, where C2=C1, and the first filter has a shunt inductance arranged downstream of the input capacitance and having a value equal to L1, where L1=L2.

3. A device as claimed in claim 1, further comprising:

i) a high-pass third filter arranged in the first branch between the first amplifier and the output terminal; and j) a low-pass fourth filter arranged in the second branch between the second amplifier and the output terminal, said third and fourth filters being symmetrical to said first and second filters, respectively.

4. A device as claimed in claim 2, further comprising:

i) a high-pass third filter arranged in the first branch between the first amplifier and the output terminal; and j) a low-pass fourth filter arranged in the second branch between the second amplifier and the output terminal, said third and fourth filters being symmetrical said first and second filters, respectively.

5. A device as claimed in claim 2, wherein one of the branches includes a delay circuit.

6. A device as claimed in claim 3, wherein one of the branches includes a delay circuit.

7. A device as claimed in claim 1, wherein the two amplifiers are identical.

8. A device as claimed in claim 2 wherein the first and second amplifiers are identical.

9. A device as claimed in claim 3, wherein the first and second amplifiers are identical.

10. A device as claimed in claim 4, wherein the first and second amplifiers are identical.

11. A device as claimed in claim 7, wherein the first and second amplifiers are constructed in hybrid integrated circuit technology and are integrated on the same substrate.

12. A device as claimed in claim 11, wherein the first and second filters are integrated on the same substrate as the two amplifiers.

\* \* \* \* \*